(12) United States Patent
Sunkavally (10) Patent No.: US 12,047,493 B2
(45) Date of Patent: Jul. 23, 2024

(54) THRESHOLD-BASED OVERRIDE OF DATA PRIVACY USING DISTRIBUTED LEDGERS AND KEY SHARES

(71) Applicant: EMC IP Holding Company LLC, Hopkinton, MA (US)

(72) Inventor: Naveen Sunkavally, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 16/668,783

(22) Filed: Oct. 30, 2019

(65) Prior Publication Data

US 2021/0135855 A1    May 6, 2021

(51) Int. Cl.
*H04L 9/08* (2006.01)
*G06Q 20/06* (2012.01)
*H04L 9/32* (2006.01)

(52) U.S. Cl.
CPC ......... *H04L 9/0825* (2013.01); *G06Q 20/065* (2013.01); *H04L 9/0822* (2013.01); *H04L 9/0838* (2013.01); *H04L 9/321* (2013.01)

(58) Field of Classification Search
CPC ..... H04L 9/0825; H04L 9/0822; H04L 9/321; H04L 9/0838; H04L 9/14; H04L 9/085; H04L 2209/38; H04L 9/3239; G06Q 20/065

See application file for complete search history.

(56) References Cited

U.S. PATENT DOCUMENTS

| | | | | |
|---|---|---|---|---|
| 7,136,489 | B1* | 11/2006 | Madhusudhana | ....... H04L 9/085 380/277 |
| 7,760,872 | B2* | 7/2010 | Lipson | .................... H04L 9/302 713/168 |
| 9,100,186 | B2* | 8/2015 | O'Hare | ................. H04L 9/0894 |
| 9,461,821 | B1* | 10/2016 | Machani | ............... H04L 9/0894 |
| 9,703,965 | B1* | 7/2017 | Robinson | ............ H04L 63/0428 |

(Continued)

OTHER PUBLICATIONS

"Nishat et al., Group-oriented encryption for dynamic groups with constant rekeying cost, Aug. 2016, Security and Communication Networks, pp. 4120-4137" (Year: 2016).*

(Continued)

*Primary Examiner* — Oleg Korsak
(74) *Attorney, Agent, or Firm* — Ryan, Mason & Lewis, LLP (57) ABSTRACT

Techniques are provided for threshold-based override of data privacy. One method comprises creating, by a service provider, an agreement with a user employing a user device, wherein the agreement is maintained on a distributed ledger, wherein user data sent to the distributed ledger is encrypted using an inner key and an outer key (split into multiple outer key shares and distributed to the user, the service provider and/or voters), wherein a predefined number of multiple outer key shares is required to reconstruct the outer key. To access the encrypted data of the user in some embodiments, the service provider: obtains a reconstructed outer key if the number of outer key shares provided by the user, the service provider and/or the voters satisfies the predefined number of outer key shares key; and decrypts the encrypted user data using the reconstructed outer key and the inner key.

20 Claims, 7 Drawing Sheets

(56) References Cited

U.S. PATENT DOCUMENTS

| | | | | |
|---|---|---|---|---|
| 10,454,674 | B1* | 10/2019 | Bar-El | H04L 63/123 |
| 10,673,626 | B2* | 6/2020 | Sandberg-Maitland | H04L 9/0822 |
| 10,701,046 | B1* | 6/2020 | Kaliski, Jr. | H04L 9/0822 |
| 11,233,658 | B2* | 1/2022 | Jarjoui | H04L 9/0822 |
| 11,550,931 | B1* | 1/2023 | Dintchev | H04L 63/0428 |
| 2003/0081789 | A1* | 5/2003 | Numao | H04L 9/085 380/278 |
| 2011/0060903 | A1* | 3/2011 | Yoshida | H04L 9/3218 713/155 |
| 2012/0173439 | A1* | 7/2012 | Levy | G06Q 50/16 705/307 |
| 2013/0039491 | A1* | 2/2013 | Unagami | G06F 21/64 380/44 |
| 2014/0089683 | A1* | 3/2014 | Miller | G06F 21/602 713/193 |
| 2014/0281558 | A1* | 9/2014 | Dixon | H04L 63/061 713/176 |
| 2016/0044001 | A1* | 2/2016 | Pogorelik | H04L 9/085 713/168 |
| 2016/0253515 | A1* | 9/2016 | Damgard | H04L 63/0428 713/165 |
| 2017/0012945 | A1* | 1/2017 | Poffenbarger | H04L 9/14 |
| 2017/0046689 | A1* | 2/2017 | Lohe | G06Q 20/40 |
| 2017/0237554 | A1* | 8/2017 | Jacobs | G06Q 20/3825 713/171 |
| 2017/0250816 | A1* | 8/2017 | Popa | G06F 21/12 |
| 2017/0250972 | A1* | 8/2017 | Ronda | H04L 9/0891 |
| 2017/0338957 | A1* | 11/2017 | Ateniese | H04L 63/061 |
| 2018/0115538 | A1* | 4/2018 | Blake | H04L 9/14 |
| 2018/0316492 | A1* | 11/2018 | Ramachandran | H04L 9/3239 |
| 2019/0007205 | A1* | 1/2019 | Corduan | G06Q 20/367 |
| 2019/0065764 | A1* | 2/2019 | Wood | H04L 9/0637 |
| 2019/0173867 | A1* | 6/2019 | Nix | H04L 9/3271 |
| 2019/0305938 | A1* | 10/2019 | Sandberg-Maitland | H04L 9/085 |
| 2019/0319792 | A1* | 10/2019 | Irwan | H04L 63/0464 |
| 2020/0044863 | A1* | 2/2020 | Yadlin | H04L 9/3247 |
| 2020/0111087 | A1* | 4/2020 | Zhou | H04L 9/3213 |
| 2020/0313884 | A1* | 10/2020 | Trevethan | H04L 9/3242 |
| 2020/0389306 | A1* | 12/2020 | Dolan | H04L 9/0631 |
| 2021/0019326 | A1* | 1/2021 | Rauch | H04L 9/3236 |
| 2021/0021426 | A1* | 1/2021 | Scherrer | H04L 9/3218 |
| 2021/0051003 | A1* | 2/2021 | Jarjoui | H04L 9/0631 |
| 2021/0083872 | A1* | 3/2021 | Desmarais | H04L 9/3247 |
| 2021/0090072 | A1* | 3/2021 | Sewell | H04L 9/0618 |

OTHER PUBLICATIONS

Acronis True Image 2020, Acronis Notary: A New Way to Prove Data Authenticity via Blockchain, 2019, https://www.acronis.com/en-us/articles/data-protection/.

Winston Maxwell et al., A Guide to Blockchain and Data Protection, Hogan Lovells, Sep. 2017.

* cited by examiner

| Function Name | Input | Authorized Addresses | What Function Does |
|---|---|---|---|
| StartVote 310 | N/A | $P_a$ | Sets VotingBeginTimestamp value to current time. Triggers a notification to voters and user. |
| VoteToRelease 320 | shareSet | $U_a$, $V_{1a}$ to $V_{na}$ | If caller is $U_a$, set UserShares variable to values in input shareSet. If caller is a voter $V_i$, sets shares in VoterShares dictionary for $V_i$ to be values in shareSet. Can only be called in time interval: [VotingBeginTimestamp + VotingDelay, VotingBeginTimestamp + VotingDelay + VotingPeriod) + min(ContractEndTimestamp, VotingBeginTimestamp + VotingDelay + VotingPeriod) ]. Note that voters can submit only a subset of their shares (partial votes are allowed). |
| EnterProvider Evidence 330 | Provider Evidence | $P_a$ | Allows provider to submit evidence supporting need to make user's data visible to provider. Sets ProviderEvidence field. Can only be invoked within time interval: [VotingBeginTimestamp, min(ContractEndTimestamp, VotingBeginTimestamp + VotingDelay)] |
| EnterUser Evidence 340 | User Evidence | $U_a$ | Allows user to submit evidence to dispute or support request to make data visible. Sets UserEvidence field. Can only be invoked within time interval: [VotingBeginTimestamp, min(ContractEndTimestamp, VotingBeginTimestamp + VotingDelay)] |
| SetUserData 350 | userData Buffer | $D_a$ | Sets current value of UserDataBuffer. For instance, this could be a vehicle updating its location. This data (which includes, e.g., a randomly generated nonce) has been double encrypted using $K_I$ and $K_O$. |

FIG. 3

Provider Invokes *StartVote* function on Smart Contract 155; and *VotingBeginTimestamp* in Contract 155 is Set;

Watchers Detect Change in Smart Contract 155 and Notify All Parties: user U, and Voters $V_1$ to $V_n$;

Evidence Gathering Period is Initiated, Starting From *VotingBeginTimestamp* to *VotingBeginTimestamp* + *VotingStartDelay*. During This Time Interval, Provider and User May Call *EnterProviderEvidence* and *EnterUserEvidence* Functions, Respectively, to Enter Evidence Pertinent to Vote;

After *VotingBeginTimestamp* + *VotingStartDelay*, Voters (and User, if desired) Vote by Releasing Their Secret Shares 175-v to Smart Contract 155 Through *VoteToRelease* Function. Voters Vote Until *VotingBeginTimestamp* + *VotingStartDelay* + *VotingPeriod*; and After *VotingPeriod* Has Expired, Provider Gathers Submitted Shares 175. If Number of Voter Shares 175-v plus Provider Shares 175-sp Amounts to More Than Required Threshold t, then Provider can Reconstruct $K_O$ and, in Conjunction with $K_I$, Decrypt User-Sensitive Data. If Insufficient Number of Shares are Present, Provider Cannot Uncover User Data.

FIG. 4

FIG. 6

THRESHOLD-BASED OVERRIDE OF DATA PRIVACY USING DISTRIBUTED LEDGERS AND KEY SHARES

FIELD

The field relates generally to information processing techniques, and more particularly, to the protection of user data.

BACKGROUND

Data privacy is often presented by service providers as a binary choice to users. Users often must either opt-in or opt-out of data collection. Once a given user opts-in for data collection, the user typically must blindly trust that the service provider will use the collected data as the service provider has stated that the collected data will be used. Service providers can easily abuse this trust without significant accountability.

Service providers may, however, have a legitimate need to violate user privacy, for example, when a user misbehaves (e.g., when a user violates a legal requirement of a legal authority, such as committing a crime or otherwise breaking the law, or breaches the terms of his or her agreement with the service provider).

A need therefore exists for improved techniques for allowing a service provider to access user data, when an appropriate need has been demonstrated by the service provider.

SUMMARY

In one embodiment, a method comprises creating, by at least one processing device of a service provider, an agreement between the service provider and a user employing a user device, wherein at least a portion of data related to the agreement is maintained on a distributed ledger, wherein the user device comprises an inner key and an outer key for encrypting data of the user that the user device sends to the distributed ledger, wherein the outer key is split into a plurality of outer key shares using a threshold secret sharing scheme, wherein a predefined number of the plurality of outer key shares is required to reconstruct the outer key and wherein one or more of the plurality of outer key shares is distributed to one or more of the user, the service provider and one or more voters; performing the following steps, by the at least one processing device of the service provider, to access at least a portion of the encrypted data of the user: initiating a request to reconstruct the outer key; obtaining the reconstructed outer key if the number of outer key shares provided by one or more of the user, the service provider and the one or more voters satisfies the predefined number of outer key shares required to reconstruct the outer key; and decrypting the at least the portion of the encrypted data of the user using the reconstructed outer key and the inner key.

In some embodiments, the obtaining of the reconstructed outer key further comprises obtaining one or more votes to release the outer key from one or more of the user, the service provider and the one or more voters. The service provider initiates may request to reconstruct the outer key to access the at least the portion of the encrypted data of the user, for example, when one the user violates a legal requirement of a legal authority and/or the user breaches terms of the agreement with the service provider.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for threshold-based override of data privacy using distributed ledgers and key shares.

As noted above, service providers may have a legitimate need to violate user privacy, for example, when a user misbehaves. Consider a car rental provider that tracks the locations of users renting their vehicles. If a user defaults on his or her car payment, then the car rental provider may want to use the vehicle location to locate the vehicle to get the vehicle back. In another use case, a hotel or another lodging provider may want to access webcam footage to collect evidence about a guest, in the event that the guest trashes his or her room. In yet another use case, a government agency may ask a cell phone provider to break into a cell phone of a user iPhone because the user is suspected of having terrorist ties.

One or more embodiments of the disclosure provide a smart contract-based solution that enables service providers to collect encrypted personal user information and allows the service providers to access at least some of the encrypted personal user information when one or more predefined limited release conditions are satisfied, as discussed further below. In this manner, users who act appropriately are not punished, as service providers do not have unrestricted access to the collected personal user information. In addition, service providers are protected when it is appropriate to override the privacy of a given user, as the service provider can access some or all of the collected personal user information.

At a high level, a distributed ledger, such as a blockchain, is a distributed append-only database (ledger) of transactions that are substantially immune to tampering. Nodes on a blockchain network, for example, use a consensus algorithm to agree upon the state of the blockchain.

In some embodiments, a smart contract is code that is executed by nodes on the blockchain. Smart contracts have local storage that can be mutated in response to function calls. These mutations, including the function input and output, are captured as transactions on the blockchain, as discussed further below in conjunction with FIG. 2. Ethereum is one example of a blockchain platform for smart contracts. While one or more embodiments of the disclosure employ a smart contract, any user agreement or other consensus between a user and a service provider for accessing the personal user information collected by the service provider pursuant to the agreement may be employed, as would be apparent to a person of ordinary skill in the art.

Thus, one or more embodiments of the disclosure employ smart contracts to enable service providers to collect information about users and to access the collected user information only when users are suspected of misbehaving.

Consider the car rental provider that tracks the locations of users renting their vehicles. If the user defaults on his or her car payment, then the car rental provider may want to use the vehicle location to locate the vehicle to get the vehicle back.

The initial parties include a service provider P (e.g., the car rental agency); a user U; a user device D (e.g., the rented car); and a set of n Voters, $V_1$ to $V_n$. The user device is gathering the personal data of the user on behalf of the provider P. The voters are trusted third parties or other arbitrators who can have the power to vote when a service provider wants to unlock the collected data of the user. As discussed herein, the service provider would generally initiate the vote to access the collected data, but the voting and reconstruction of shares can happen through another system.

At the outset, provider P and user U reach an agreement as it relates to device D. The device is imprinted with two secret keys, an inner key $K_I$, and an outer key $K_O$. If the device is a shared device or can otherwise transfer between users (for instance, a car being rented out), then this imprinting happens in some embodiments every time that the device is used by a different user.

Thus, the inner key $K_I$ is a secret key known only to U and P. In addition, the outer key $K_O$ is a secret key known only by the device. In one or more embodiments, a key splitting scheme such as Shamir's secret sharing scheme, splits the outer key $K_O$ into s total shares, with a predefined threshold parameter of t. In at least some embodiments, the total number of shares s is set such that:

$$s = P_s + U_s + \text{sum}(V_{is} \text{ across all } V_i),$$

where $P7_s$ is the number of shares allocated to P, $U_s$ is the number of shares granted to U, and $V_{is}$ is the number of shares granted to each voter $V_i$. The number of shares allocated to any party can be thought of as a weight or power granted to that party. While the weights are arbitrary, the weights must generally adhere to the following rules:

$P_s < t$; and $V_{is} < t$ for all $V_i$.

In other words, the provider and no single voter should have enough shares to immediately uncover the outer key $K_O$. In some embodiments, the user is allowed to have more shares than the threshold, if desired. Since the inner key $K_I$ is known only to the user and the service provider, the data is not exposed on the blockchain even if the outer key $K_O$ is reconstructed.

As the user device gathers private user data, the user device first encrypts the private user data using the inner key $K_I$ and then encrypts the partially encrypted private user data using the outer key $K_O$. A randomly generated nonce can be included encrypted with the data in some embodiments to ensure that the encrypted data looks different even if the private user data remains the same.

Figure 1:
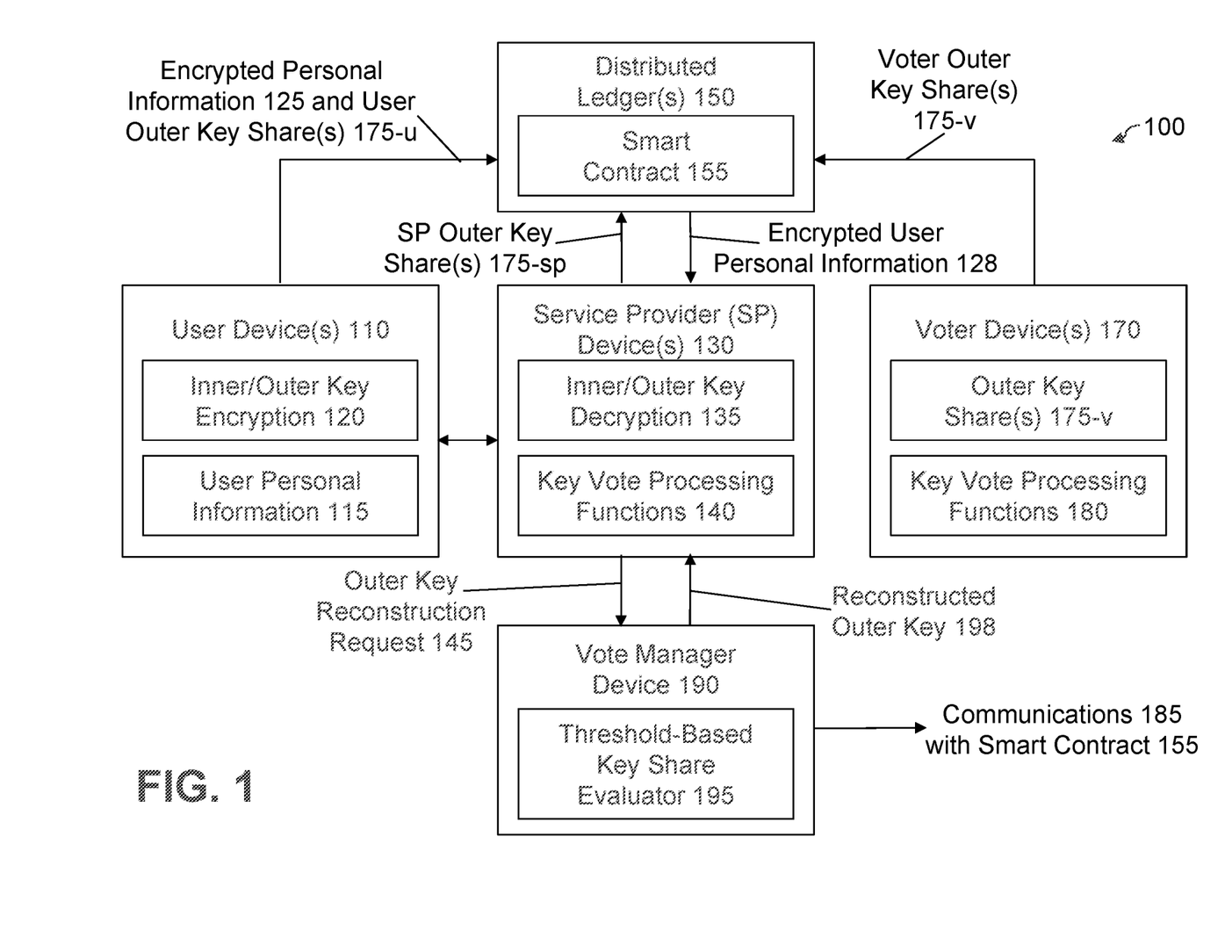
FIG. 1 illustrates an exemplary environment for threshold-based override of data privacy, according to one embodiment of the disclosure.

FIG. 1 illustrates an exemplary environment 100 for threshold-based override of data privacy, according to one embodiment of the disclosure. As shown in FIG. 1, the exemplary environment 100 comprises one or more user devices 110 that provide user personal information 115 encrypted using inner/outer key encryption 120 for one or more service provider device(s) 130. As noted above, the inner key $K_I$ is a secret key known only to U and P; and the outer key $K_O$ is a secret key known only by the user device 110.

In addition, as shown in FIG. 1, a set of n Voters, $V_1$ to $V_n$, employing one or more voter devices 170, are arbitrators who can have the power to vote when a service provider wants to unlock the encrypted personal information of the user. As noted above, the outer key is split into a plurality of outer key shares 175-u, 175-sp, 175-v (collectively, referred to herein as outer key shares 175), discussed below, distributed to one or more of the user device 110, the service provider device 130 and the voter devices 170, respectively.

In some embodiments, when the user U and the service provider S enter into an agreement, a smart contract C (155) is created in one or more distributed ledgers 150, as discussed further below in conjunction with FIG. 2, which may be implemented, for example, as a blockchain.

As shown in FIG. 1, the user personal information 115 encrypted using inner/outer key encryption 120 forms encrypted personal information 125. The user device 110 sends the encrypted personal information 125 of the user and other data related to the agreement to the smart contract 155 in the distributed ledger 150, in one or more embodiments. In an embodiment having an optional data custodian, discussed below, then the user device 110 updates the smart contract 155 with one or more hash values of the encrypted personal information 125 to reference the data stored by the data custodian, and sends the actual data to the data custodian.

The service provider device 130 comprises one or more key vote processing functions 140 to initiate an outer key reconstruction request 145 to a vote manager device 190 in order to collect the necessary outer key shares 175 to access the encrypted user personal information 128. The vote manager device 190 may be associated, for example, with a trusted third party. In some embodiments, the vote manager device 190 distributes the outer key shares 175-u, 175-sp, 175-v to one or more of the user device 110, the service provider device 130 and the voter devices 170, respectively. As discussed further below, the service provider must collect enough outer key shares 175 using inner/outer key decryption 135 during a voting phase to reconstruct the outer key to access at least some of the encrypted user personal information 128 from the smart contract 155.

A given voter device 170 comprises one or more outer key shares 175-v, as well as one or more key vote processing functions 180 to receive requests from the vote manager device 190 for votes for outer key shares 175 and to provide such outer key shares 175-v when the respective voter deems it appropriate to release at least some of the encrypted personal information 125 to the service provider, as discussed herein.

As shown in FIG. 1, the vote manager device 190 comprises a threshold-based key share evaluator 195 to process the votes (outer key shares 175) received from one or more of the user device 110, the service provider device 130 and the voter devices 170; and to determine whether the specified key share threshold has been satisfied. Following the outer key reconstruction request 145, the one or more of the user device 110, the service provider device 130 and the voter devices 170 send outer key shares 175 to the smart contract 155. When the threshold is satisfied, the vote manager device 190 reconstructs a reconstructed outer key 198 and provides the reconstructed outer key 198 to the service provider device 130. In a further variation, the vote manager device 190 may provide the collected outer key shares 175 to the service provider device 130 and the service provider device 130 generates the reconstructed outer key 198 itself. The vote manager device 190 also interacts with the smart contract 155 in the distributed ledger 150 using communications 185 between the vote manager device 190 and the smart contract 155.

The user devices 110 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers." The user devices 110, service provider devices 130, distributed ledgers 150, voter devices 170, and vote manager devices 190 of FIG. 1 can be coupled using a network (not shown), where the network is assumed to represent a sub-network or other related portion of a larger computer network.

Figure 2:
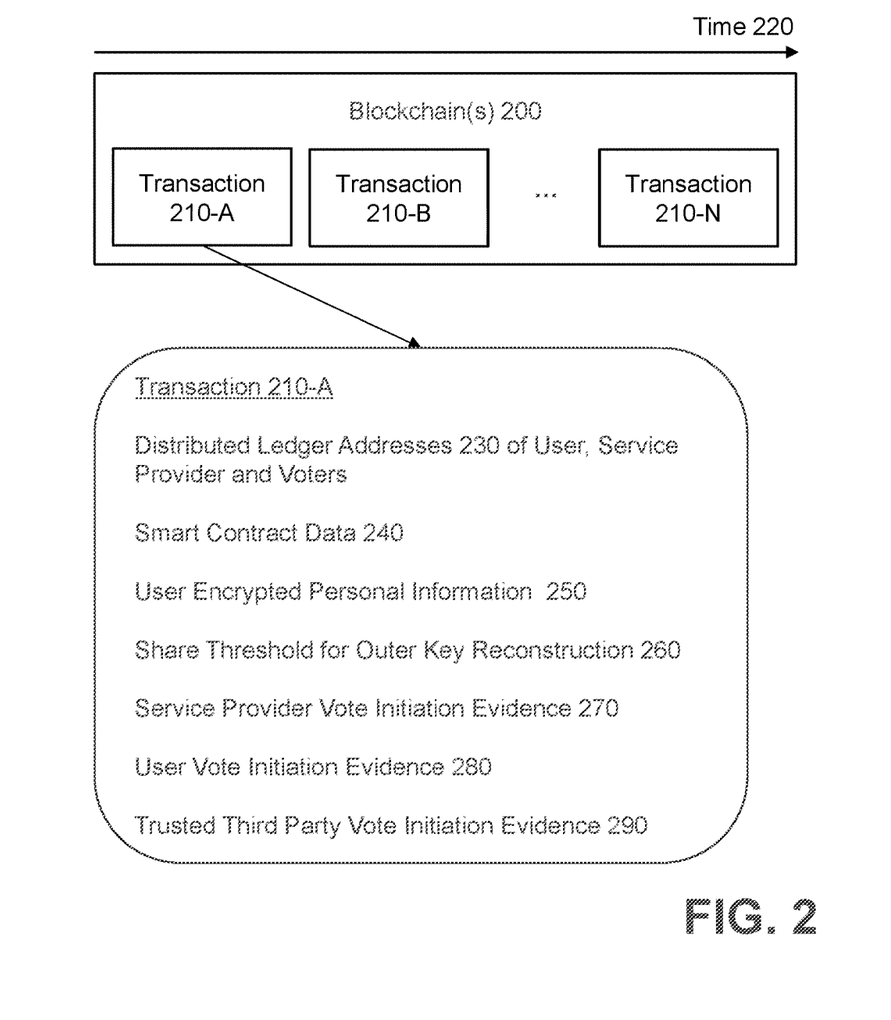
FIG. 2 illustrates an exemplary blockchain implementation of the distributed ledger of FIG. 1, according to some embodiments.

FIG. 2 illustrates an exemplary blockchain 200 of the distributed ledger 150 of FIG. 1, according to some embodiments. Generally, a blockchain 200, also referred to as a distributed ledger, is a technology that runs across disparate compute resources and supplies a secure transaction service.

As shown in FIG. 2, the exemplary blockchain 200 comprises a plurality of transactions 210-A through 210-N. Transactions 210 are typically recorded in the blockchain 200 in such a way that the registered transactions 210 cannot be altered. In addition, transactions 210 are often signed by the private key of a user and may include a signature. In the example of FIG. 2, transaction 210-N comprises a more recent transaction (not necessarily the latest transaction), based on a time axis 220, and transaction 210-A comprises a less recent transaction (not necessarily the earliest transaction).

Transactions 210-A through 210-N have unique identifiers and cannot be disputed. Typically, anything saved in the blockchain 200 will remain there and can be verified at any later time.

In at least one embodiment, a given transaction, such as transaction 210-A, on the exemplary blockchain 200 comprises the following representative information: distributed ledger addresses 230 of user, service provider and voters; smart contract data 240; user encrypted personal information 250; share threshold for outer key reconstruction 260; service provider vote initiation evidence 270; user vote initiation evidence 280; and trusted third party vote initiation evidence 290.

In one exemplary embodiment, the contract between a given user and given service provider has the following immutable and mutable storage elements, for example, as one or more transactions 210 in the blockchain 200:

Immutable Storage:
Blockchain Addresses:
$P_a$: the provider address;
$U_a$: the user address;
$V_{1a}$ to $V_{na}$: the address of each voter Vi; and
$D_a$: the device address.
Contract Data:
ContractDataSalt: randomly generated buffer of bytes;
ContractDataHash: data describing the contract between the user and service provider, hashed with a secure hash function along with the ContractDataSalt;
ContractStartTimestamp: when this contract starts;
ContractEndTimestamp: when this contract ends (the timestamp does not necessarily have to be the same as the time that the user has the device; for example, a car rental agency may want the smart contract to last for a predefined period (e.g., 10 days) after the vehicle is returned to verify, for example, that the vehicle is in good condition; and
t, the share threshold.
Voting Parameters:
VotingDelay: the amount of time from when a vote is called for by the provider and when voting actually begins; and
VotingPeriod: how long the voting period lasts.
Mutable Storage:
UserDataBuffer: an arbitrary sized buffer for holding encrypted data gathered by the device D. (empty at the outset);
VoterShares: A dictionary $\{V_{ai} \rightarrow Shares_{Vi}\}$ that maps each voter to an array of shares (empty at the outset);
UserShares: An array of shares (empty at the outset);
VotingBeginTimestamp: the timestamp that a vote was called for by the provider; and
Dispute Data:
ProviderEvidence: an arbitrary sized buffer for storing evidence provided by the provider when a provider wants to unlock the personal data of the user; and
UserEvidence: an arbitrary sized buffer for containing evidence provided by the user when the user wants to prevent the provider for unlocking the personal data of the user.

In at least some embodiments, the immutable elements are defined at the time the contract is constructed. The mutable elements are initialized to be empty and can change over the lifetime of the contract.

The blockchain addresses of the provider, user device, and voters are known in advance and tied to their public identities. An implementation of the present disclosure is not specific as to how this identity management takes place. There are a number of existing solutions for identity management, such as maintaining a decentralized registry. The device identity itself can be tied to a known attribute about the device such as its serial number or in the case of a vehicle, a vehicle identification number.

The identity of the user is anonymized in one or more embodiments. A new blockchain address is created for the user each time a smart contract is established.

Figure 3:
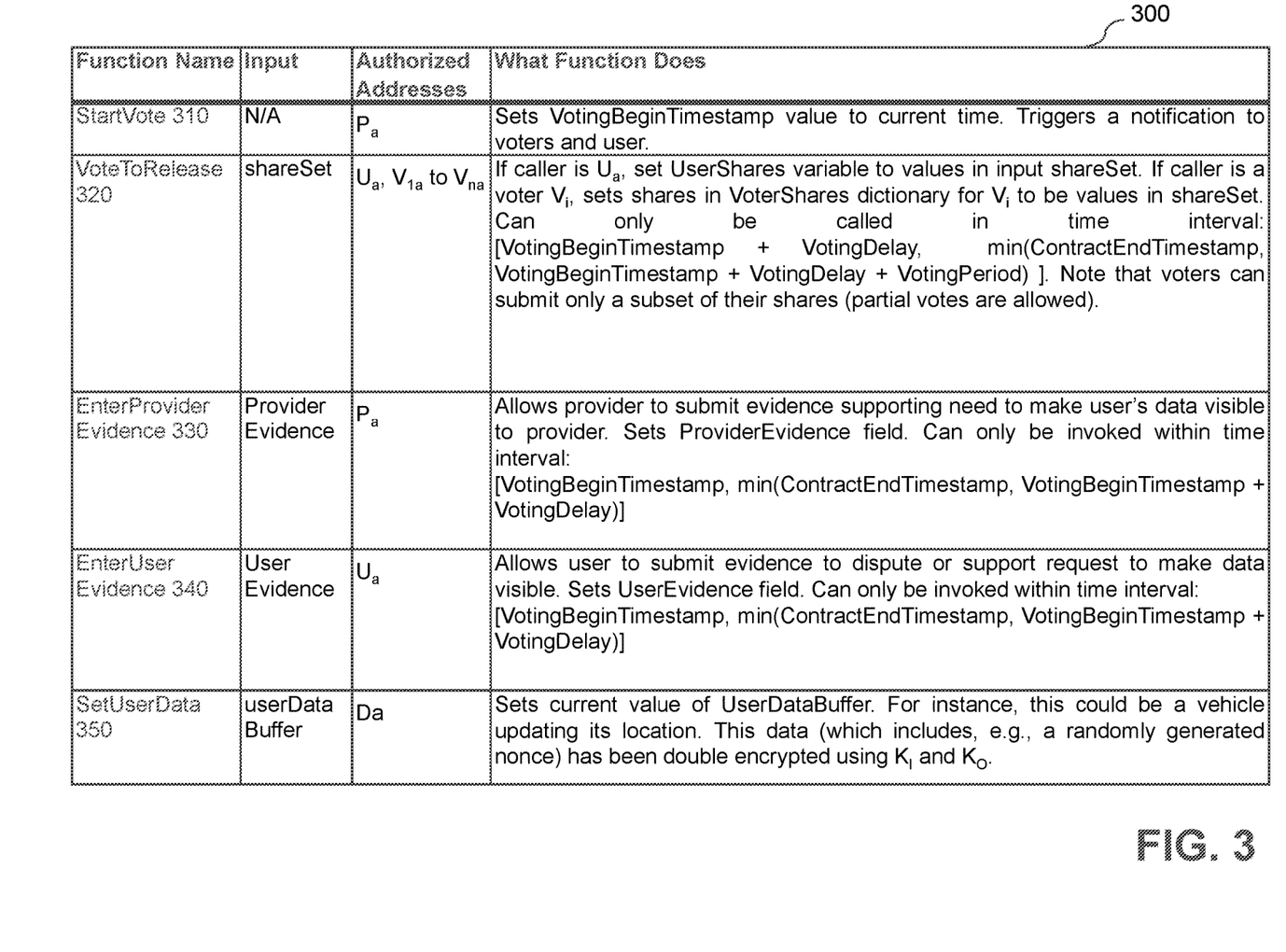
FIG. 3 illustrates a number of exemplary functions provided by a smart contract to mutate the mutable smart contract state, according to one embodiment.

FIG. 3 illustrates a number of exemplary functions 300 provided by a smart contract to mutate the mutable smart contract state, according to one embodiment. The functions 300 are only accessible to certain addresses. The security model of the blockchain plus the contract code can enforce this type of access control.

As shown in FIG. 3, a StartVote function 310 sets the VotingBeginTimestamp value to the current time and triggers a notification to the voters and user.

A VoteToRelease function 320 operates based on the entity providing the vote. If the caller is $U_a$, then function 320 sets the UserShares variable to the values in the input shareSet. If the caller is a voter $V_i$, then function 320 sets the shares in the VoterShares dictionary for $V_i$ to be the values in the shareSet. The function 320 can only be called in the time interval: [VotingBeginTimestamp+VotingDelay, min (ContractEndTimestamp, VotingBeginTimestamp+VotingDelay+VotingPeriod)]. It is noted that voters can submit only a subset of their shares (partial votes are allowed).

An EnterProviderEvidence function 330 allows the provider to submit evidence supporting the need to make the user data visible to the provider. The function 330 sets the ProviderEvidence field and can only be invoked within the time interval [VotingBeginTimestamp, min(ContractEndTimestamp, VotingBeginTimestamp+VotingDelay)].

An EnterUserEvidence function 340 allows the user to submit evidence to dispute or support the request to make data visible. The function 340 sets the UserEvidence field and can only be invoked within the time interval [VotingBeginTimestamp, min(ContractEndTimestamp, VotingBeginTimestamp+VotingDelay)]

A SetUserData function 350 sets the current value of UserDataBuffer. For example, the function 350 could be employed by a vehicle updating its location. This data (which includes a randomly generated nonce in at least some embodiments) is double encrypted using the inner key $K_I$ and the outer key $K_O$.

Consider a user U and a provider P that enter into an agreement over the usage of a device D. The device is imprinted with two keys, $K_I$ and $K_O$, as described above, and outer key shares are generated for $K_O$. Before the user takes the device, the provider constructs the smart contract on the blockchain 200 using the immutable elements discussed above. The user can inspect and validate the elements of the smart contract, specifically the ContractDataHash, ContractStartTimestamp, and ContractEndTimestamp. If the user does not accept the legitimacy of the smart contract, then the user simply walks away and does not take the device. If the user accepts the smart contract, he/she takes the device, along with his/her shares (if any), $K_I$, smart contract address, and user address. The provider retains $K_I$, the provider's shares (if any), and the smart contract address. Separately, the voter shares are distributed to the voters, for example, by the vote manager device 190 of FIG. 1. The shares can be distributed using existing protocols and methods to achieve the distribution without the provider or user directly handing over the shares to the voters.

During the course on the contract, the user device 110 collects user data, double encrypts it, and sends it to the smart contract address via the SetUserData function.

Figure 4:
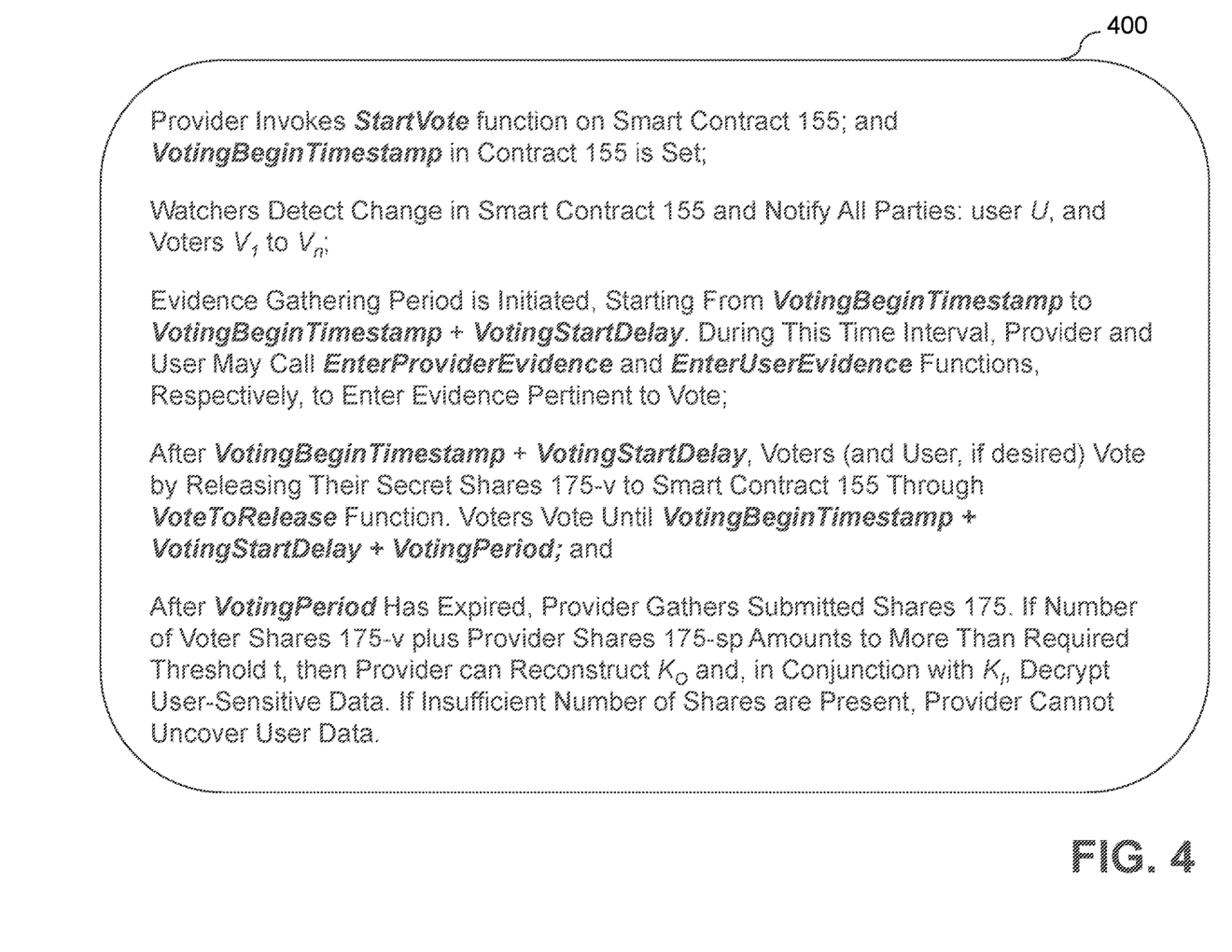
FIG. 4 illustrates exemplary pseudo code for an outer key share voting process, according to an embodiment of the disclosure.

FIG. 4 illustrates exemplary pseudo code for an outer key share voting process 400, according to an embodiment of the disclosure. In the event that the provider suspects that the user is misbehaving (for instance the user has defaulted on making a payment), the provider can initiate a vote. The outer key share voting process 400 proceeds, as follows:

1. Provider invokes the StartVote function on the smart contract 155. The VotingBeginTimestamp in the smart contract 155 is set.
2. Watchers (e.g., via automated programs or Publish/Subscribe mechanism) notice the change in the smart contract 155 and notify all parties: the user U, and the Voters $V_1$ to $V_n$.
3. An evidence gathering period is initiated, starting from VotingBeginTimestamp to VotingBeginTimestamp+VotingStartDelay. During this interval of time, the provider and user can call the EnterProviderEvidence and EnterUserEvidence functions 330, 340, respectively, to enter evidence pertinent to the vote.
4. After VotingBeginTimestamp+VotingStartDelay, voters (and the user if he/she wants to) vote by releasing their voter outer key shares 175-v to the smart contract 155 through the VoteToRelease function 320. Voters can vote up until VotingBeginTimestamp+VotingStartDelay+VotingPeriod.
5. After the VotingPeriod has expired, the provider (or the vote manager device 190) gathers the voter outer key shares 175-v that were submitted. If the number of voter outer key shares 175-v provided by voters, in addition to the provider outer key shares 175-sp already held by the service provider, amount to more than the required threshold t, then the service provider can reconstruct the outer key $K_O$ and, in conjunction with the inner key $K_I$, and then decrypt the encrypted personal information 125. If enough shares are not present, however, then the provider cannot uncover the encrypted personal information 125.

Using an Oracle for Submitting Evidence

In the terminology of smart contracts, an Oracle is a trusted third party that submits facts onto the blockchain network that can be used by smart contracts to make decisions. Oracles are required in some embodiments because smart contracts, such as those developed by Ethereum, are cut off from the network and do not have the ability to query external data. Moreover, since each node in the blockchain network is executing the smart contract, it is not reliable for each node to independently ascertain facts. The established method for injecting facts therefore is often to use an Oracle. The Oracle itself may be centralized or decentralized.

In the context of the present disclosure, an Oracle can be used to inject facts into the smart contract that support one or more preconditions being violated by the user that justify releasing the encrypted personal information 125. For instance, in the car rental use case, a third party could automatically report when a user has defaulted on his or her payment. The exact conditions and the type of Oracle in place depends on the type of smart contract being executed, as would be apparent to a person of ordinary skill in the art.

In one exemplary implementation, the smart contract described above is extended with the following attributes:

Immutable Storage:
Addresses:
$O_a$: blockchain address of the Oracle.
Mutable Storage:
OracleEvidence: arbitrary byte buffer containing evidence submitted by an Oracle In addition, an EnterOracleEvidence function is also provided that receives the OracleEvidence as an input and the authorized addresses is the address of the Oracle $O_a$. The additional EnterOracleEvidence function sets the OracleEvidence field in the mutable storage with the input OracleEvidence, and triggers a notification to all parties.

In addition, the following changes are made to the overall flow to accommodate the Oracle:

At the time the smart contract is established, the blockchain address of the Oracle is also entered with the smart contract. The Oracle is also given the smart contract address.

During the course of the smart contract, if the Oracle detects that a condition is breached (e.g., the user has defaulted on his/her loan payment), the Oracle calls the EnterOracleEvidence function on the smart contract.

The provider is automatically notified through a watcher program that monitors the smart contract. The provider can then choose to call for a vote by calling the StartVote function, or the watcher program can automatically initiate a vote by directly calling StartVote.

Note that even absent any evidence from the Oracle, the provider can still initiate a vote directly, as discussed further below in conjunction with FIG. 4. In other words, the presence of evidence from an Oracle is not necessarily a prerequisite to call a vote.

Automated Voting

An automated voting variation builds upon the use of an Oracle, as described above. In some embodiments, the automated voting variation automates one or more of the Voters.

In one exemplary implementation, the smart contract described above is extended with the following attributes:

When the provider calls the StartVote function 310 on the smart contract, all of the voters are notified by "watcher" programs that a vote has been requested.

The "watcher" program for any given Voter can automatically call the VoteToRelease function 320 on the smart contract based on the evidence in the contract. For example, if an Oracle has entered evidence that a user has defaulted on his/her loan, a Voter could automatically release his/her shares. The exact logic for automatically releasing shares depends on the type of smart contract in question, as would be apparent to a person of ordinary skill in the art.

Such automated voting would be appropriate in cases, for example, where the evidence is very clear that the user has misbehaved in a certain way, and the Oracle and/or provider can be trusted. Such automated voting may not be appropriate, however, for cases where a human determination is needed based on extenuating circumstances. A combination of automated and human voting can be used to hedge against automated voters being too strict.

Using a Data Custodian

In the models described above, the user device 110 directly enters its encrypted personal information 125 and other data into the smart contract. If the frequency or size of data is high, a third party centralized or decentralized data custodian can be used to store the data. This data custodian merely receives the encrypted blocks and stores them. The data custodian has no visibility into the actual data itself. Now, instead of putting the data in the smart contract, the user device 110 stores a hash of the data in the smart contract, as follows.

The smart contract described above is modified in this way:

Immutable Storage:
ProviderShareCount: number of shares allocated to P.
Mutable Storage:
UserDataBufferHash: a byte buffer holding a hash of the UserDataBuffer sent to the data custodian.
ProviderRequestedDataHashes: a set of UserDataBufferHashes that the provider is requesting to release.

In addition, the StartVote function is modified to receive providerRequestedDataHashes as an input and the authorized addresses is still the address of the provider Pa. The modified the StartVote function sets the VotingBeginTimestamp value to the current time, and sets the ProviderRequestedDataHashes to the input providerRequestedDataHashes, and triggers a notification to the voters and user.

In addition, a SetUserDataHash function is provided in some embodiments to receive userDataBufferHash as an input and the authorized addresses is the address of the user device 110 $D_a$. The SetUserDataHash function sets the current value of UserDataBufferHash of a user data buffer that was sent to the custodian.

At the time the contract is established, the number of provider shares is also registered into the smart contract.

The modified voting process works as follows. The provider initially calls for a vote by calling the modified StartVote function and the service provider passes in the hashes of the data he/she wants to access. In addition, a "watcher" program monitors the vote on behalf of the Data Custodian. If enough shares are released by the Voters, then the Data Custodian automatically releases the encrypted data blocks requested by the Provider. Those blocks must have hashes that correspond to the hashes requested by the Provider in the modified StartVote call. The "watcher" program can automatically determine if enough shares have been released by adding the ProviderShareCount with the number of voter-released shares and comparing that sum against the threshold t.

Figure 5:
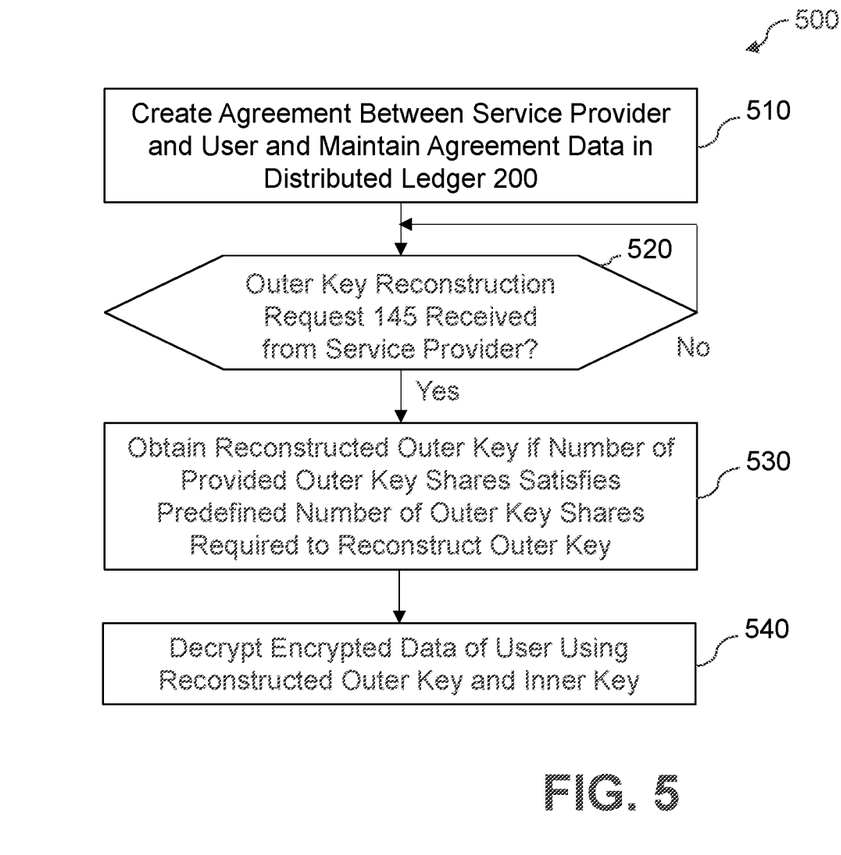
FIG. 5 is a flow chart illustrating an exemplary implementation of a threshold-based data privacy override process, according to at least one embodiment of the disclosure.

FIG. 5 is a flow chart illustrating an exemplary implementation of a threshold-based data privacy override process 500, according to one embodiment of the disclosure. As shown in FIG. 5, the exemplary threshold-based data privacy override process 500 initially creates, by the service provider during step 510, an agreement between the service provider and a user employing a user device. A portion of data related to the agreement is maintained on a distributed ledger. The user device comprises an inner key and an outer key for protecting data of the user that the user device sends to the distributed ledger. In addition, the outer key is split into a plurality of outer key shares using a threshold secret sharing scheme, and a predefined number of the plurality of outer key shares is required to reconstruct the outer key. The outer key shares are distributed to the user, the service provider and/or one or more voters. The user device encrypts user data by encrypting the user data using the inner key and the outer key.

During step 520, a test is performed to determine if an outer key reconstruction request 145 is received from the service provider. Once it is determined during step 520 that an outer key reconstruction request 145 has been received from the service provider, the exemplary threshold-based data privacy override process 500 obtains the reconstructed outer key 198 during step 530, if the number of outer key shares provided by the user, the service provider and/or the voters satisfies the predefined number of outer key shares required to reconstruct the outer key.

Finally, the exemplary threshold-based data privacy override process 500 decrypts the portion of the encrypted data of the user during step 540 using the reconstructed outer key and the inner key.

One or more aspects of the disclosure recognize that existing solutions for data privacy provide a lot of unchecked control to the service provider. The disclosed techniques for threshold-based override of data privacy provide a way for service providers to access encrypted user data when needed, while also protecting properly behaving users. The disclosed techniques do not remove the concept of trust. Rather, the disclosed techniques distribute trust among defined specific roles and functions (the provider, user, device, voters, Oracle, data custodian), and distributes trust across those roles. Using a blockchain makes the performed actions public and auditable. If a party tries to subvert the process (e.g., a bad voter or Oracle), that will be transparent and will affect the reputation of that party.

In some embodiments, the disclosed techniques for threshold-based override of data privacy distribute the trust among various entities and provide accountability before a service provider may access protected user data, when an appropriate need has been demonstrated.

One or more embodiments of the disclosure provide improved methods, apparatus and computer program products for threshold-based override of data privacy using distributed ledgers and key shares. The foregoing applications and associated embodiments should be considered as illustrative only, and numerous other embodiments can be configured using the techniques disclosed herein, in a wide variety of different applications.

It should also be understood that the disclosed threshold-based data privacy override techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for threshold-based data privacy override may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based threshold-based data privacy override engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based threshold-based data privacy override platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
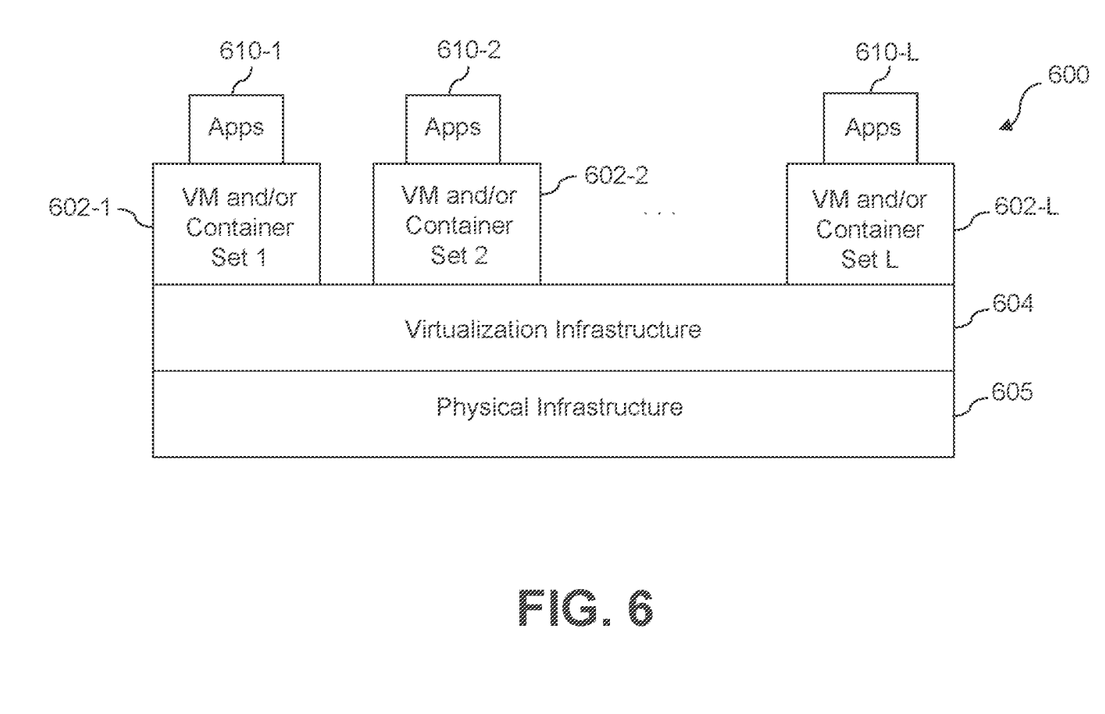
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of an information processing system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide threshold-based data privacy override functionality of the type described above for one or more processes running on a given one of the VMs. For example, each of the VMs can implement threshold-based data privacy override control logic and associated outer key share voting for providing threshold-based data privacy override functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide threshold-based data privacy override functionality of the type described above for one or more processes running on different ones of the containers. For example, a container host device supporting multiple containers of one or more container sets can implement one or more instances of threshold-based data privacy override control logic and associated outer key share voting for use in threshold-based data privacy override.

As is apparent from the above, one or more of the processing modules or other components of environment 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
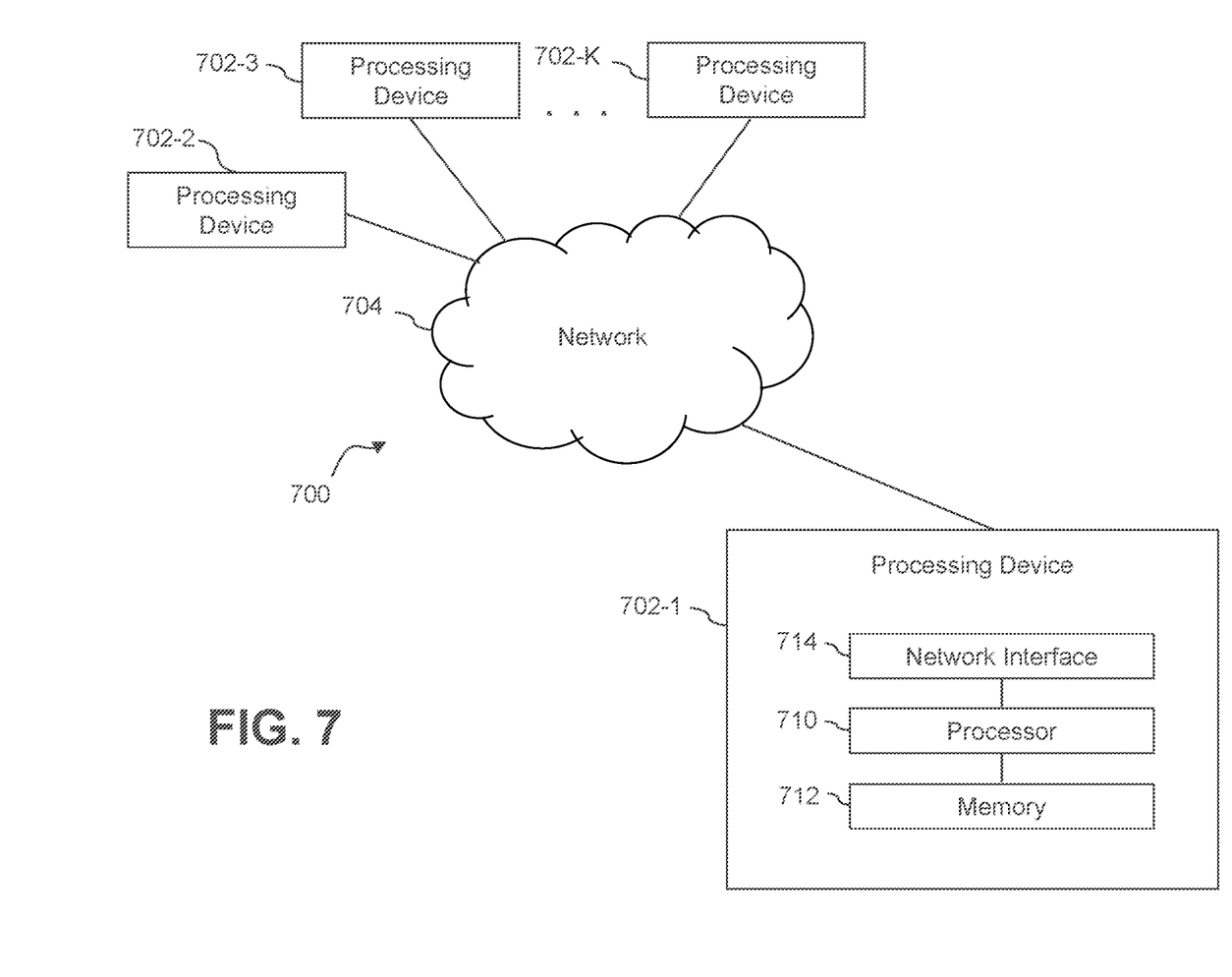
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

creating, by at least one processing device of a service provider, an agreement between the service provider and a user employing a user device, wherein at least a portion of data related to the agreement is maintained on a distributed ledger, wherein the user device comprises an inner key and an outer key for encrypting data of the user that the user device sends to the distributed ledger, wherein the inner key comprises a secret key known to the user device and the service provider, wherein the user device encrypts the data of using the inner key, and then the user device further encrypts the partially encrypted data of the user using the outer key to generate encrypted data of the user, and the user device sends the encrypted data of the user, encrypted using the inner key and the outer key, to the distributed ledger, wherein the outer key is split into a plurality of outer key shares using a threshold secret sharing scheme, wherein a designated number of the plurality of outer key shares is required to reconstruct the outer key and wherein the plurality of outer key shares is distributed to at least two of the user device, the at least one processing device of the service provider and one or more voter devices;

performing the following steps, by the at least one processing device of the service provider, to access at least a portion of the encrypted data of the user:

initiating a request to reconstruct the outer key, wherein one or more of the user device, the at least one processing device of the service provider and the one or more voter devices provide outer key shares responsive to the request;

obtaining the reconstructed outer key in response to the number of provided outer key shares satisfying the designated number of outer key shares required to reconstruct the outer key; and decrypting the at least the portion of the encrypted data of the user, obtained from the distributed ledger, using the reconstructed outer key and the inner key.

2. The method of claim 1, wherein the agreement further comprises one or more of a first buffer for storing evidence provided by the service provider in response to the service provider initiating the request to reconstruct the outer key to access the at least the portion of the encrypted data of the user and a second buffer for storing evidence provided by the user to prevent the service provider from accessing the at least a portion of the encrypted data of the user.

3. The method of claim 1, wherein the obtaining the reconstructed outer key further comprises obtaining one or more votes to release the outer key from one or more of the user device, the at least one processing device of the service provider and the one or more voter devices.

4. The method of claim 1, wherein the service provider initiates the request to reconstruct the outer key in response to one or more of: the user violating a legal requirement of a legal authority and the user breaching one or more terms of the agreement with the service provider.

5. The method of claim 1, wherein a number of shares allocated to each of the user, the service provider and each voter comprises a voting weight granted to the respective party.

6. The method of claim 5, wherein the number of shares assigned to the service provider and to each individual voter is less than the designated number of outer key shares required to reconstruct the outer key.

7. The method of claim 1, wherein a trusted third party submits evidence to be evaluated by one or more of the user, the service provider and one or more voters.

8. The method of claim 7, wherein the one or more voters automatically release respective outer key shares based at least in part on the evidence submitted by the trusted third party using predefined logic to evaluate the evidence.

9. The method of claim 1, wherein the encrypted data of the user is stored one or more of: (i) as part of the agreement in the distributed ledger; and (ii) in a data storage by a data custodian with one or more hash values of the encrypted data stored in the distributed ledger to reference the data stored by the data custodian.

10. The method of claim 1, wherein the inner key is known only to the user and the service provider and whereby the data remains protected on the distributed ledger when the outer key is reconstructed.

11. The method of claim 1, wherein one or more of: (i) the service provider comprises one or more of a car rental provider and a lodging provider, and wherein the service provider initiates the request to reconstruct the outer key in response to the user breaching one or more terms of the agreement with the service provider; and (ii) the service provider comprises a government agency and wherein the service provider initiates the request to reconstruct the outer key in response to the user violating a legal requirement of a legal authority.

12. An apparatus comprising:

at least one processing device comprising a processor coupled to a memory;

the at least one processing device corresponding to a service provider and being configured to implement the following steps:

creating, by at least one processing device of a service provider, an agreement between the service provider and a user employing a user device, wherein at least a portion of data related to the agreement is maintained on a distributed ledger, wherein the user device comprises an inner key and an outer key for encrypting data of the user that the user device sends to the distributed ledger, wherein the inner key comprises a secret key known to the user device and the service provider, wherein the user device encrypts the data of the user using the inner key, and then the user device further encrypts the data of the user using the outer key to generate encrypted data of the user, and the user device sends the encrypted data of the user, encrypted using the inner key and the outer key, to the distributed ledger, wherein the outer key is split into a plurality of outer key shares using a threshold secret sharing scheme, wherein a designated number of the plurality of outer key shares is required to reconstruct the outer key and wherein the plurality of outer key shares is distributed to at least two of the user device, the at least one processing device of the service provider and one or more voter devices;

performing the following steps, by the at least one processing device of the service provider, to access at least a portion of the encrypted data of the user:

initiating a request to reconstruct the outer key, wherein one or more of the user device, the at least one processing device of the service provider and the one or more voter devices provide outer key shares responsive to the request;

obtaining the reconstructed outer key in response to the number of provided outer key shares satisfying the designated number of outer key shares required to reconstruct the outer key; and decrypting the at least the portion of the encrypted data of the user, obtained from the distributed ledger, using the reconstructed outer key and the inner key.

13. The apparatus of claim 12, wherein the agreement further comprises one or more of a first buffer for storing evidence provided by the service provider in response to the service provider initiating the request to reconstruct the outer key to access the at least the portion of the encrypted data of the user and a second buffer for storing evidence provided by the user to prevent the service provider from accessing the at least a portion of the encrypted data of the user.

14. The apparatus of claim 12, wherein the obtaining the reconstructed outer key further comprises obtaining one or more votes to release the outer key from one or more of the user device, the at least one processing device of the service provider and the one or more voter devices.

15. The apparatus of claim 12, wherein the service provider initiates the request to reconstruct the outer key in response to one or more of: the user violating a legal requirement of a legal authority and the user breaching one or more terms of the agreement with the service provider.

16. The apparatus of claim 12, wherein a trusted third party submits evidence to be evaluated by one or more of the user, the service provider and one or more voters, and wherein the one or more voters automatically release respective outer key shares based at least in part on the evidence submitted by the trusted third party using predefined logic to evaluate the evidence.

17. A non-transitory processor-readable storage medium having stored therein program code of one or more software programs, wherein the program code when executed by at least one processing device of a service provider causes the at least one processing device of the service provider to perform the following steps:

creating, by at least one processing device of a service provider, an agreement between the service provider and a user employing a user device, wherein at least a portion of data related to the agreement is maintained on a distributed ledger, wherein the user device comprises an inner key and an outer key for encrypting data of the user that the user device sends to the distributed ledger, wherein the inner key comprises a secret key known to the user device and the service provider, wherein the user device encrypts the data of the user using the inner key, and then the user device further encrypts the partially encrypted data of the user using the outer key to generate encrypted data of the user, and the user device sends the encrypted data of the user, encrypted using the inner key and the outer key, to the distributed ledger, wherein the outer key is split into a plurality of outer key shares using a threshold secret sharing scheme, wherein a designated number of the plurality of outer key shares is required to reconstruct the outer key and wherein the plurality of outer key shares is distributed to at least two of the user device, the at least one processing device of the service provider and one or more voter devices;

performing the following steps, by the at least one processing device of the service provider, to access at least a portion of the encrypted data of the user:

initiating a request to reconstruct the outer key, wherein one or more of the user device, the at least one processing device of the service provider and the one or more voter devices provide outer key shares responsive to the request;

obtaining the reconstructed outer key in response to the number of provided outer key shares satisfying the designated number of outer key shares required to reconstruct the outer key; and decrypting the at least the portion of the encrypted data of the user, obtained from the distributed ledger, using the reconstructed outer key and the inner key.

18. The non-transitory processor-readable storage medium of claim 16, wherein the agreement further comprises one or more of a first buffer for storing evidence provided by the service provider in response to the service provider initiating the request to reconstruct the outer key to access the at least the portion of the encrypted data of the user and a second buffer for storing evidence provided by the user to prevent the service provider from accessing the at least a portion of the encrypted data of the user.

19. The non-transitory processor-readable storage medium of claim 17, wherein the obtaining the reconstructed outer key further comprises obtaining one or more votes to release the outer key from one or more of the user device, the at least one processing device of the service provider and the one or more voter devices.

20. The non-transitory processor-readable storage medium of claim 17, wherein a trusted third party submits evidence to be evaluated by one or more of the user, the service provider and one or more voters, and wherein the one or more voters automatically release respective outer key shares based at least in part on the evidence submitted by the trusted third party using predefined logic to evaluate the evidence.

* * * * *

UNITED STATES PATENT AND TRADEMARK OFFICE
CERTIFICATE OF CORRECTION

PATENT NO. : 12,047,493 B2
APPLICATION NO. : 16/668783
DATED : July 23, 2024
INVENTOR(S) : Naveen Sunkavally Page 1 of 1

It is certified that error appears in the above-identified patent and that said Letters Patent is hereby corrected as shown below:

In the Claims

Column 15, Lines 4-7, in Claim 1, replace "wherein the user device encrypts the data of using the inner key, and then the user device further encrypts the partially encrypted data of the user using the outer key to generate encrypted data of the user, ..." with --wherein the user device encrypts the data of the user using the inner key, and then the user device further encrypts the data of the user using the outer key to generate encrypted data of the user, ...--

Column 17, Lines 38-40, in Claim 17, replace "..., and then the user device further encrypts the partially encrypted data of the user using the outer key to generate encrypted data of the user, and" with --..., and then the user device further encrypts the data of the user using the outer key to generate encrypted data of the user, and--

Column 18, Lines 21-22, in Claim 18, replace "The non-transitory processor-readable storage medium of claim 16, wherein the agreement further ..." with --The non-transitory processor-readable storage medium of claim 17, wherein the agreement further ...--

Signed and Sealed this
Twenty-seventh Day of August, 2024

Katherine Kelly Vidal
*Director of the United States Patent and Trademark Office*